(12) United States Patent
Darvas et al.

(10) Patent No.: US 7,988,919 B2
(45) Date of Patent: Aug. 2, 2011

(54) LABORATORY SCALE CONTINUOUS FLOW HYDROGENATION PROCESS

(75) Inventors: Ferenc Darvas, Budapest (HU); Lajos Godorhazy, Erd (HU); Tamas Karancsi, Budapest (HU); Daniel Szalay, Budapest (HU); Ferenc Boncz, Budapest (HU); Laszlo Urge, Budapest (HU)

(73) Assignee: ThalesNano Zrt, Budapest (HU)

( * ) Notice: Subject to any disclaimer, the term of this patent is extended or adjusted under 35 U.S.C. 154(b) by 0 days.

(21) Appl. No.: 12/907,239

(22) Filed: Oct. 19, 2010

(65) Prior Publication Data

US 2011/0034704 A1    Feb. 10, 2011

Related U.S. Application Data

(60) Division of application No. 11/593,601, filed on Nov. 7, 2006, now Pat. No. 7,837,949, which is a continuation-in-part of application No. PCT/HU2005/000046, filed on May 9, 2005.

(30) Foreign Application Priority Data

May 7, 2004   (HU) .................................. 04 00944
Aug. 23, 2004 (HU) .................................. 04 01727

(51) Int. Cl.
*G05D 16/00* (2006.01)
*B01J 19/00* (2006.01)
(52) U.S. Cl. ........ 422/112; 422/130; 422/129; 585/263; 585/264; 208/142; 208/143
(58) Field of Classification Search ............... 422/130, 422/112, 129; 585/263, 264; 208/142, 143
See application file for complete search history.

(56) References Cited

U.S. PATENT DOCUMENTS

| | | | |
|---|---|---|---|
| 4,551,325 | A | 11/1985 | Alesandrini, Jr. et al. |
| 5,725,756 | A | 3/1998 | Subramaniam et al. |
| 6,156,933 | A | 12/2000 | Poliakoff et al. |
| 6,432,283 | B1 | 8/2002 | Fairlie et al. |
| 6,675,844 | B2 | 1/2004 | Gottschalk et al. |
| 6,994,827 | B2 | 2/2006 | Safir et al. |
| 2003/0118483 | A1 | 6/2003 | Militzer et al. |

FOREIGN PATENT DOCUMENTS

| | | |
|---|---|---|
| DE | 10 156 246 | 6/2003 |
| EP | 1 258 284 | 11/2002 |
| WO | WO 94/09897 | 5/1994 |
| WO | WO 97/41953 | 11/1997 |
| WO | WO 00/09647 | 2/2000 |
| WO | WO 03/099743 | 12/2003 |
| WO | WO 2004/014542 | 2/2004 |

*Primary Examiner* — Walter D Griffin
*Assistant Examiner* — Lessanework Seifu
(74) *Attorney, Agent, or Firm* — Young & Thompson (57) ABSTRACT

A process for hydrogenating a sample in a pressure range below supercritical pressure values includes supplying at least a solvent of the sample to be hydrogenated by a feed pump with a constant volume rate into a flow path to create a base solution; adding the sample being dissolved into the flow path; feeding hydrogen into the flow path through a valve configured to transmit hydrogen only into a single direction; leading the dissolved sample in the presence of a catalyst through a hydrogenation reactor, where the reactor is inserted into a section of the flow path located after the hydrogen feeding position; maintaining the pressure of the reaction in a given pressure range by element of a pressure-adjusting unit, and collecting a hydrogenate formed within the hydrogenation reactor in a product receptacle connected to the end of the flow path.

11 Claims, 3 Drawing Sheets

LABORATORY SCALE CONTINUOUS FLOW HYDROGENATION PROCESS

CROSS REFERENCE TO RELATED APPLICATIONS

This application is a divisional of co-pending application Ser. No. 11/593,601 filed on Nov. 7, 2006, which is a Continuation in part of International Application No. PCT/HU05/00046 filed on May 9, 2005, which claims priority to Hungarian Applications No. P 04 01727 filed on Aug. 23, 2004 and No. P 04 00944 filed on May 7, 2004. The entire contents of each of the above-identified applications are hereby incorporated by reference.

BACKGROUND OF THE INVENTION

1. Field of the Invention

The invention relates to a laboratory scale continuous flow hydrogenation process of given samples under normal, i.e. not supercritical conditions. In particular, the invention relates to a laboratory scale continuous flow hydrogenation process exploiting a laboratory scale continuous flow hydrogenation apparatus comprising a reservoir, a feed pump, a collecting element with two inlets and an outlet, a hydrogenation reactor and a pressure-adjusting unit, all connected into a flow path, as well as a hydrogen source and a valve transmitting a gas stream only into a single direction and connected between the hydrogen source and the second inlet of the collecting element, wherein the pressure-adjusting unit is connected into the flow path after the hydrogenation reactor.

2. Description of the Related Art

Hydrogenating processes (from now on, hydrogenation) are widely used methods of modern chemical industry (including also pharmaceutical industry). Hydrogenation is used in the chemical synthesis of organic compounds: hydrogen is incorporated into starting molecules—optionally in the presence of a catalyst—at given positions and thereby qualitatively different molecules are generated from the starting molecules.

In pharmaceutical industry, to develop a new active ingredient molecule a great number of new molecules is synthesized from the starting molecules, wherein the new molecules can even be used later on as the starting molecules of a subsequent synthesis. A common feature of the processes applied is that generally only a tiny amount (i.e. at most a few milligrams) of material is produced in a single synthesis, however, the number of new substances obtained in syntheses performed consecutively increases rapidly. Consequently, the effective handling of the numerous compounds being generated in the syntheses requires the highest possible amount of automatization in the process.

This problem especially strongly arises in the field of combinatorial chemical syntheses, where a relatively fast and automated synthesis/derivatisation, as well as analysis of molecules of a whole library is needed.

U.S. Pat. No. 6,156,933 and International Publication No. WO 03/099743 both disclose a laboratory scale continuous flow hydrogenation apparatus and a hydrogenating process exploiting such an apparatus. The apparatuses concerned comprise a reservoir that stores the substance to be hydrogenated or its solution (from now on, the sample solution), a feed pump in communication with the reservoir, a mixer connected to the feed pump by one of its inlets, a hydrogen source connected to a further inlet of the mixer through a compressor, a hydrogenation reactor connected to the outlet of the mixer, a heating/cooling means and a pressure reduction unit connected to the outlet of the reactor. A catalyst is arranged within the reactor for effecting the hydrogenation reaction. The pressure reduction unit comprises a valve and has at least two outlets. The valve's task is to control the flow rate measured in the reactor, and thereby the pressure prevailing within the flow path of the apparatus.

By using said apparatuses and within the processes making use of the apparatuses concerned one performs a so-called supercritical hydrogenation. The main point of supercritical hydrogenation is that a carrier medium (a so-called fluid, being inert as far as hydrogenation is concerned) is used for effecting hydrogenation which, due to its specific pressure and temperature, is capable of carrying a huge amount of dissolved hydrogen. The advantage of supercritical hydrogenation over hydrogenation performed under non-supercritical circumstances is that hydrogen, which poorly dissolves in non-supercritical organic solvents, is almost completely miscible with supercritical fluids, and hence, by making use of such fluids, a great deal of hydrogen can be delivered to the actual location of the reaction.

Accordingly, the apparatuses used for carrying out hydrogenation reactions under supercritical conditions also comprise a unit for assuring the feed of the fluid needed by the supercritical hydrogenation; this unit is connected to a third inlet of the mixer via its outlet. While hydrogenation is taking place in the apparatuses, the sample solution, the fluid and the hydrogen necessary for hydrogenation are all fed into the mixer, and the mixture being formed within the mixer is then passed into the reactor. In the meantime, the mixture is made supercritical (that is, its pressure and temperature values are set to fall into the vicinity of the fluid's critical point or to induce supercriticality thereof), as a consequence of which hydrogen completely blends with the fluid getting supercritical. The hydrogenation takes place within the reactor—in the supercritical state—and the mixture leaving the reactor and containing the product then flows into the pressure reduction unit, wherein by decreasing the pressure, the product is separated from the fluid and is withdrawn for further utilization through one of the outlets. The fluid and the hydrogen that had not been consumed in the reaction are simply let off to the surroundings or circulated back to their sources for recycling purposes.

Furthermore, U.S. Pat. No. 5,725,756 discloses a continuous laboratory scale hydrogenation process to be carried out strictly under supercritical conditions. Said U.S. patent also discloses a laboratory scale continuous flow experimental setup with a reactor for effecting the process. As shown in FIG. 1 of the document at issue, a feed stock also containing the sample to be hydrogenated is supplied by means of a HPLC pump into the flow path of the setup from a reservoir storing the feed stock as a mixture of a solvent and the sample. Supercritical conditions required for the reactions are provided within the reactor, wherein the catalyst arranged in the reactor is previously subjected to a careful pre-treatment process.

International Publication No. WO 2004/014542 describes a method and a device for conducting batch-type, i.e. non-continuous laboratory scale chemical experiments involving first and second reactants, wherein the first reactant is provided as a liquid mixture of a solvent and a sample material in a reaction vessel, and the second reactant is formed in particular by a catalyst that is preferably pre-treated under certain conditions before being introduced into the reaction vessel for achieving the reaction of the first reactant.

International Publication No. WO 00/09647 discloses a batch-type or a continuous laboratory scale hydrogenation process that is conducted under supercritical conditions. The sample material to be hydrogenated is mixed with a solvent, particularly with ethanol, and stored in and supplied as a stock feed directly from a reservoir by means of a metering pump.

A common disadvantage of the above discussed apparatuses and processes operating essentially under supercritical conditions is that hydrogenation performed under supercritical conditions requires the usage of structural elements handling the fluid (eg. feeding thereof, inducing a change in its pressure and temperature and accomplishing its separation). The application of these structural elements increases the dimensions and the operational risk of the apparatuses, makes the construction and the operation of the apparatuses, as well as the effectuation of the hydrogenating processes more complicated and significantly raises the production costs. A further disadvantage of said apparatuses and processes is that depending on the starting materials used for the in-situ production, i.e. within the reactor, of hydrogen needed to perform the hydrogenation, besides the final product, undesired and reactive by-product(s) also build(s) up in certain cases. Furthermore, the application of the apparatuses concerned is also disadvantageous when the final derivatisation operations of combinatorial chemistry are performed, as in this case the library synthesis is required to take place as rapidly as possible with the least possible extent of human interference. In certain cases this can also result in a need for a fast and automated replacement of the inert fluid and the catalyst used, for which the laboratory scale continuous flow apparatuses disclosed in the above cited documents are not conditioned at all.

SUMMARY OF THE INVENTION

Accordingly, the object of the invention is to develop such a laboratory scale continuous flow hydrogenation process by means of which on the one hand one or more of the above disadvantages can be eliminated or significantly reduced, that is, in particular, hydrogenation reactions can be accomplished under normal, i.e. not supercritical conditions and without the formation of undesired byproducts as a result of in-situ hydrogen production, on the other hand even a library amount of molecules can be derived in a fast and automated manner.

As a result of the experiments carried out in order to find a solution for achieving one or more of the above objects, it was concluded that by providing the sample to be hydrogenated separately from the solvent used to dissolve it, and by creating and maintaining a continuous flow of a base solution through the laboratory scale hydrogenation apparatus at a constant volume rate, it becomes possible to adjust the pressure within the apparatus in such a manner that the highest pressure values building up at the place of the hydrogenation reaction do not exceed pressure values related to supercritical conditions, which means that the hydrogenation process can be conducted under normal conditions.

In one aspect of the present invention, there is provided a laboratory scale continuous flow hydrogenation process for hydrogenating a sample in a pressure range below supercritical pressure values, comprising the steps of (i) supplying at least a solvent of the sample to be hydrogenated by means of a feed pump into a flow path;
(ii) feeding hydrogen into said flow path through a valve on a section located after the sample supplying position of said flow path;
(iii) leading dissolved sample in the presence of a catalyst through a hydrogenation reactor, wherein said reactor being inserted into a section of the flow path located after the hydrogen feeding position;

(iv) maintaining the pressure of the reaction in a given pressure range by means of a pressure-adjusting unit inserted into the flow path after the hydrogenation reactor, said pressure adjusting unit being capable of tuning said pressure in a quasi-continuous manner;
(v) collecting a hydrogenate formed within the hydrogenation reactor in a product receptacle connected to the end of the flow path, wherein furthermore
during said step (i) creating a base solution from said solvent and providing a flow of said base solution with said pump having a substantially constant volume rate, and adding said sample into said flow path; and
in said step (iv) setting the upper value of the pressure range by the pressure-adjusting unit simultaneously with the base solution of step (i) flowing through the reactor to a value that falls below supercritical pressure values of the base solution.

Preferably, the sample to be hydrogenated is supplied into the flow path in given periods.

Furthermore, within successive periods different samples are supplied and the hydrogenates generated in periods are separately collected. In a further embodiment of the process according the invention each sample period is hydrogenated in different hydrogenation reactors.

The sample to be hydrogenated is preferably supplied together with the solvent.

Preferably, in a section of the flow path preceding the hydrogenation reactor the temperature of the dissolved sample is changed to the prescribed temperature of the reaction that falls below supercritical temperature values of the base solution.

BRIEF DESCRIPTION OF THE DRAWING FIGURES

The invention will now be explained in detail with reference to the accompanied drawings, wherein.

DETAILED DESCRIPTION OF THE INVENTION

Figure 1:
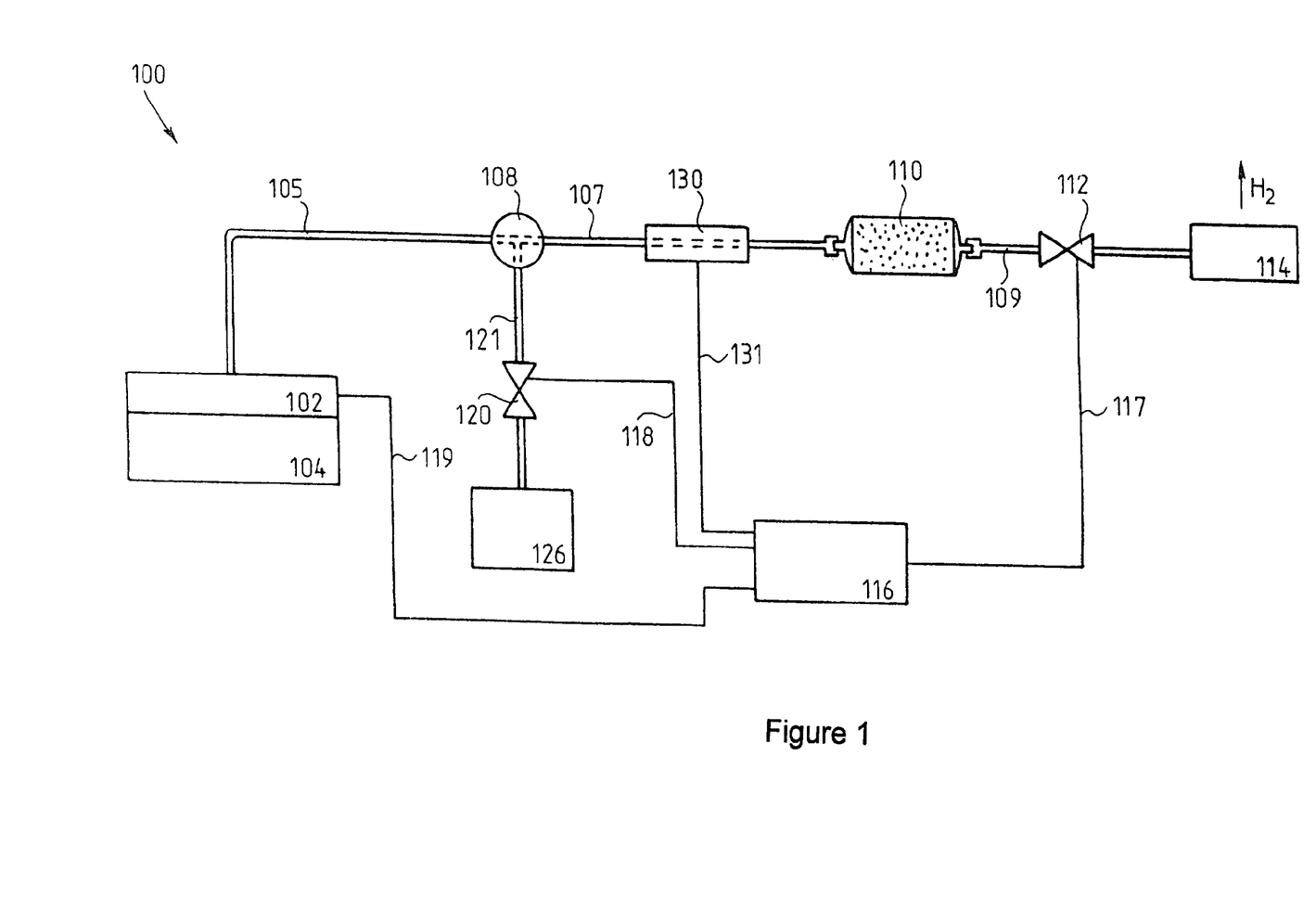
FIG. 1 is a schematic block diagram of a laboratory scale hydrogenation apparatus to be used for performing the hydrogenation process according to the invention.

The hydrogenation apparatus 100 shown schematically in FIG. 1 comprises a reservoir 104 equipped with a feed pump 102, a collecting element 108, a hydrogenation reactor 110, a pressure-adjusting unit 112, a product receptacle 114, a controlling electronics 116, a valve 120 and a hydrogen source 126. The inlet of the feed pump 102 is in fluid communication with the reservoir 104, while its outlet is connected through a pipe 105 to a first inlet of the collecting element 108. The hydrogen source 126 is connected to a second inlet of the collecting element 108 through a pipe 121 and the valve 120 inserted into the pipe 121. The outlet of the collecting element 108 is connected through a pipe 107 to the inlet of the hydrogenation reactor 110. The outlet of the hydrogenation reactor 110 opens into the product receptacle 114 through a pipe 109 and the pressure-adjusting unit 112 inserted into the pipe 109. As a result of connecting the listed elements to each other, the hydrogenation apparatus 100 will be provided with a continuous flow path extending from the outlet of the feed pump 102 to the inlet of the product receptacle 114. The hydrogenation apparatus 100 is also provided with a heating/cooling means 130 which is arranged in the flow path just before the hydrogenation reactor 110 and has a heat transferring or heat exchanging relation with the pipe 107.

The programmable controlling electronics 116 is electrically connected with the pressure-adjusting unit 112, the valve 120 and the feed pump 102 via electrical leads 117, 118 and 119, respectively. The controlling electronics 116 is electrically connected also with the heating/cooling means 130 via an electrical lead 131.

The reservoir 104 contains the sample solution, that is the substance to be hydrogenated or the solution thereof. If a homogeneous catalytic reaction is to be performed, the catalyst, in a suitable form, is admixed to the sample solution, and hence it is also present in the reservoir 104. The feeding of the sample solution (optionally containing also a catalyst) into the flow path is effected by the feed pump 102. The feed pump 102 is preferably a HPLC pump capable of providing continuous flow of the sample solution at a constant flow rate. In practice, the HPLC pump is a precision pump that operates at a constant rate of feed preset according to needs under the pressure created and continuously maintained by the pressure-adjusting unit 112; here the rate of feed can be, of course, arbitrarily modified.

The collecting element 108 is preferably formed as a T-shaped member. In order to assist the reaction occurring within the hydrogenation reactor 110, the element 108 blends the sample solution and the pressurized hydrogen which enter through its inlets. As a consequence, a hydrogen-bubbled sample solution exits through the outlet of the collecting element 108. To decrease the size of the bubbles (preferably to create micro-bubbles), the inlet of the collecting element 108 through which hydrogen enters is provided with an end piece made of frit. The element 108 can be formed, however, as any other member which is capable of insuring adequate mixing of the fed sample solution and the fed gaseous hydrogen.

The valve 120 impedes the backflow of the sample solution to the hydrogen source 126. The valve 120 is preferably an electronically controlled (pressure regulating) back-pressure valve which is actuated by the controlling electronics 116. The valve's control range, given in terms of the pressure values established in the valve chamber, is of a ratio of at least 1:6, and preferably 1:6 to 1:12.

As it is well-known, the gaseous hydrogen is an extremely dangerous material, its handling and storing generally requires the usage of peculiar means and a compliance with proper safety measures. Therefore, in case of the solution according to the invention, the hydrogen gas used for hydrogenation is generated on the spot (in situ): hydrogen is obtained preferably from water by means of electrolysis (i.e. by decomposition of water). Accordingly, in its preferred embodiment the hydrogen source 126 comprises at least one asymetric pressure electrolytical cell. The quantity of the evolved hydrogen is controlled by the intensity of the electrolyzing direct current. The partial pressure of the generated hydrogen before its feeding into the collecting element 108 is preferably 1 to 500 bar, more preferably 100 bar. Constructing the hydrogen source 126 as electrolytical cell(s) makes the hazardous operation of handling and storing of hydrogen absolutely safe. The hydrogen source 126 can also be a hydrogen storing cylinder equipped with a reductor.

The heating/cooling means 130 serves for adjusting the required temperature of the hydrogen-bubbled sample solution. In its preferred embodiment the heating/cooling means 130 is constructed as heating/cooling filament(s) wound onto a given portion of the pipe 107. The heating/cooling means 130 is actuated by the controlling electronics 116 via the lead 131 on basis of the signal of a temperature sensor (not shown in the figures) performing continuous measuring of the temperature within the heating/cooling means 130.

The hydrogenation reactor 110 is preferably manufactured as a closed (preferentially cylindrical) cartridge of tubular shape having an inlet and an outlet. The reactor 110 is joined into a suitably formed portion of the pipe 109 by means of detachable connections in a replaceable way. Accordingly, in a possible embodiment of the reactor 110 the inlet and the outlet are provided with threads and are joined into the pipe 109 by means of a flare joint along with the use of a proper sealing. Other detachable connecting techniques (eg. a quick connection system made of acid-proof and corrosion resistant steel) known by a person skilled in the relevant art can equally be used for joining the reactor 110 into the pipe 109.

The inner diameter of the reactor 110 is preferably 5 to 10 times larger than the inner diameters of its outlet and inlet. The inner diameter of the reactor 110 is preferably 4 to 5 mm, and its length is 30 to 100 mm, preferably 40 to 50 mm.

The reactor 110 is equally appropriate for performing homogenous and heterogeneous hydrogenation. An immobilized medium (i.e. a medium being incapable of leaving the reactor 110 together with the flowing sample solution) is arranged within the reactor 110 which significantly increases the residence time of the sample solution spent in the reactor 110. The immobility of the medium is accomplished eg. by arranging filter elements in the reactor 110 at the opposite ends thereof, which filter elements do not transmit the medium. Another way for providing immobility of the medium is that it is produced with a spatially contiguous porous geometrical structure, eg. as a web built up of a plurality of fibers. In case of homogeneous hydrogenation, said medium does not contain a solid catalyst. In case of heterogeneous reactions, the medium comprises eg. solid catalyst particles, a web or a mesh of fibers coated with a catalyst or made of a catalyst, tiny beads coated with a catalyst, or any combination thereof. The catalyst used is chosen in accordance with the actual hydrogenating process to be performed.

The pressure-adjusting unit 112 is an electronically controlled precision motor-driven pressure regulating valve which is arranged at the end of the flow path and adjusts the pressure necessary for the hydrogenating process in the flow path and maintains it at a constant value. Due to its construction, the pressure regulating valve is extremely sensitive; it is capable of tuning the value of the pressure in very fine steps, almost continuously. The operating pressure range of the pressure-adjusting unit 112 extends from 1 to 500 bar, preferably from 80 to 200 bar. The pressure-adjusting unit 112 is actuated by the controlling electronics 116.

The pipes 105, 107, 109, 121 are manufactured as capillaries with internal diameters ranging from 0.05 mm to 1.0 mm, preferably of 0.5 mm, made of pressure-tight materials.

In what follows, the operation of the laboratory scale hydrogenation apparatus 100 is discussed in detail.

After the hydrogenation apparatus 100 has been brought into action, upon a signal of the controlling electronics 116 the feed pump 102 commences to feed the sample solution from the reservoir 104 through the pipe 105 into the flow path at a preset constant flow rate which falls preferably between 0.1 ml/s and 10 ml/s. At the same time, upon a signal of the controlling electronics 116 the valve 120 opens, and hence gaseous hydrogen flows into the flow path from the hydrogen source 126 through the pipe 121.

To provide a continuous feed of hydrogen, the pressure of the hydrogen gas flowing through the pipe 121 is higher than that of the sample solution flowing in the pipe 105. To create a prescribed pressure (necessary for the hydrogenation) in the flow path, the pressure-adjusting unit 112—also upon a signal of the controlling electronics 116—closes simultaneously with the opening of the valve 120. The fed sample solution and the fed hydrogen gas meet in the collecting element 108, where a mixing of the two streams takes place. The resulting hydrogen-bubbled sample solution flows through the outlet of the collecting element 108 and the pipe 107 into the hydrogenation reactor 110 provided as a replaceable cartridge, meanwhile under supervision of the controlling electronics 116 the heating/cooling means 130 adjusts the temperature of the sample solution to the required value. The sample solution fed into the reactor 110 progresses towards the outlet of the reactor 110 through the free (unfilled) space available within the medium arranged in the reactor 110, and in the meantime it is thoroughly mixed with the hydrogen carried by it. At the same time, the desired hydrogenation reaction (which is either a homogeneous or a heterogeneous catalytic reaction depending on the composition of the sample solution and that of the medium being present in the reactor 110) takes place within the reactor 110. The expansion of the reaction to the whole sample solution residing within the reactor 110 is provided partly by adjusting the temperature of the sample solution before it enters the reactor 110, partly by setting the residence time (which is accomplished by fixing the packing density used by the filling of the cartridge-type reactor 110 with the medium in the fabrication process thereof), and partly by maintaining the pressure in the flow path by the pressure-adjusting unit 112. The product solution (the hydrogenate), which optionally also contains gaseous hydrogen, being produced from the sample solution travelling through the medium arranged within the reactor 110 enters the product receptacle 114 through the outlet of the reactor 110, the pipe 109 and the pressure-adjusting unit 112. The hydrogen from the hydrogenate being discharged into the receptacle 114 simply exits to the surroundings and/or by suitable means it can be collected and then recirculated to the outlet of the hydrogen source 126.

The above-discussed laboratory scale hydrogenation apparatus—when the reservoir 104 is continuously refilled with the sample solution—is mainly appropriate for the continuous production of a single hydrogenate in larger amounts.

Figure 2:
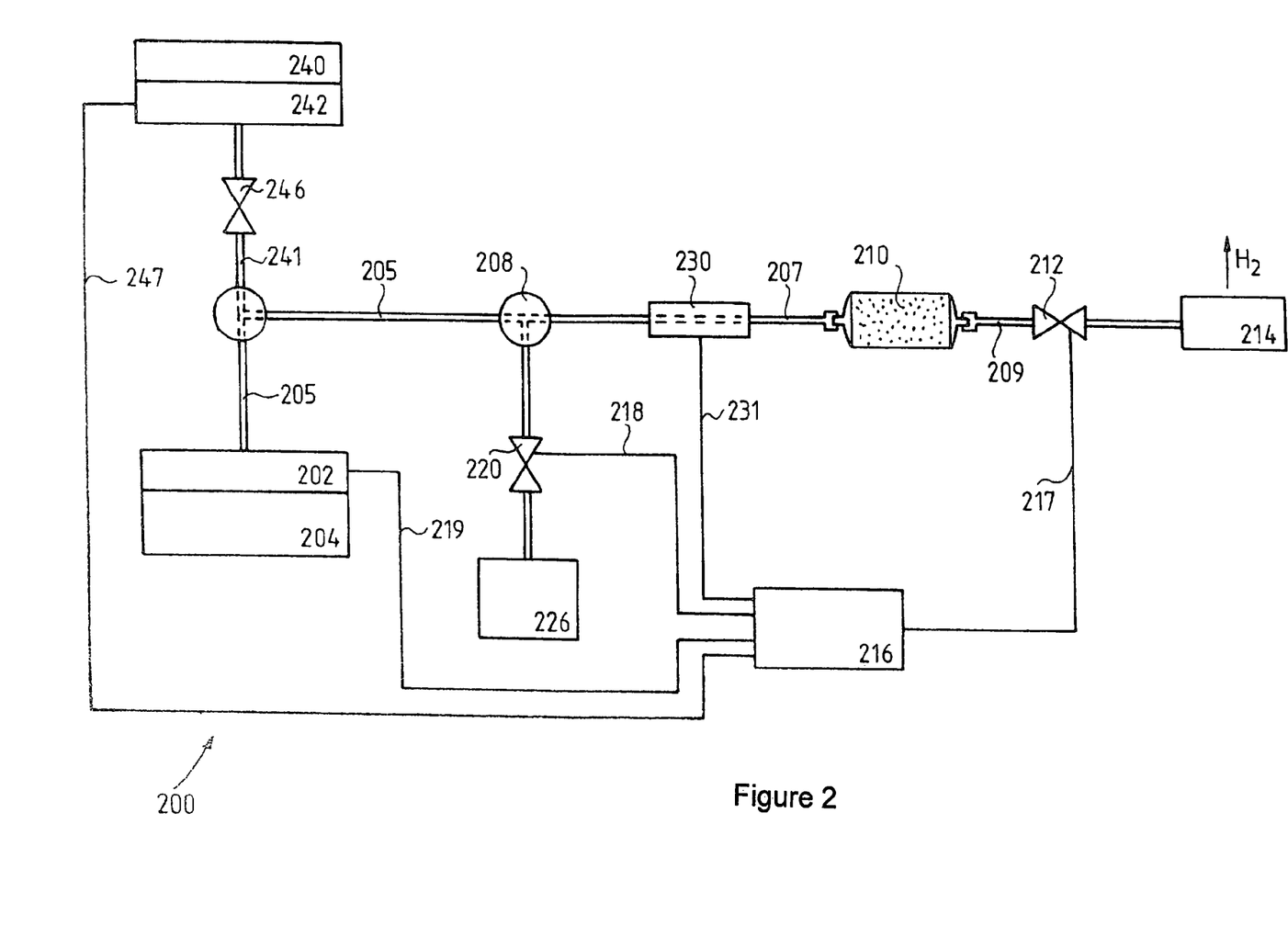
FIG. 2 is a schematic block diagram of a further laboratory scale hydrogenation apparatus to be used for performing the hydrogenation process according to the invention.
Figure 3:
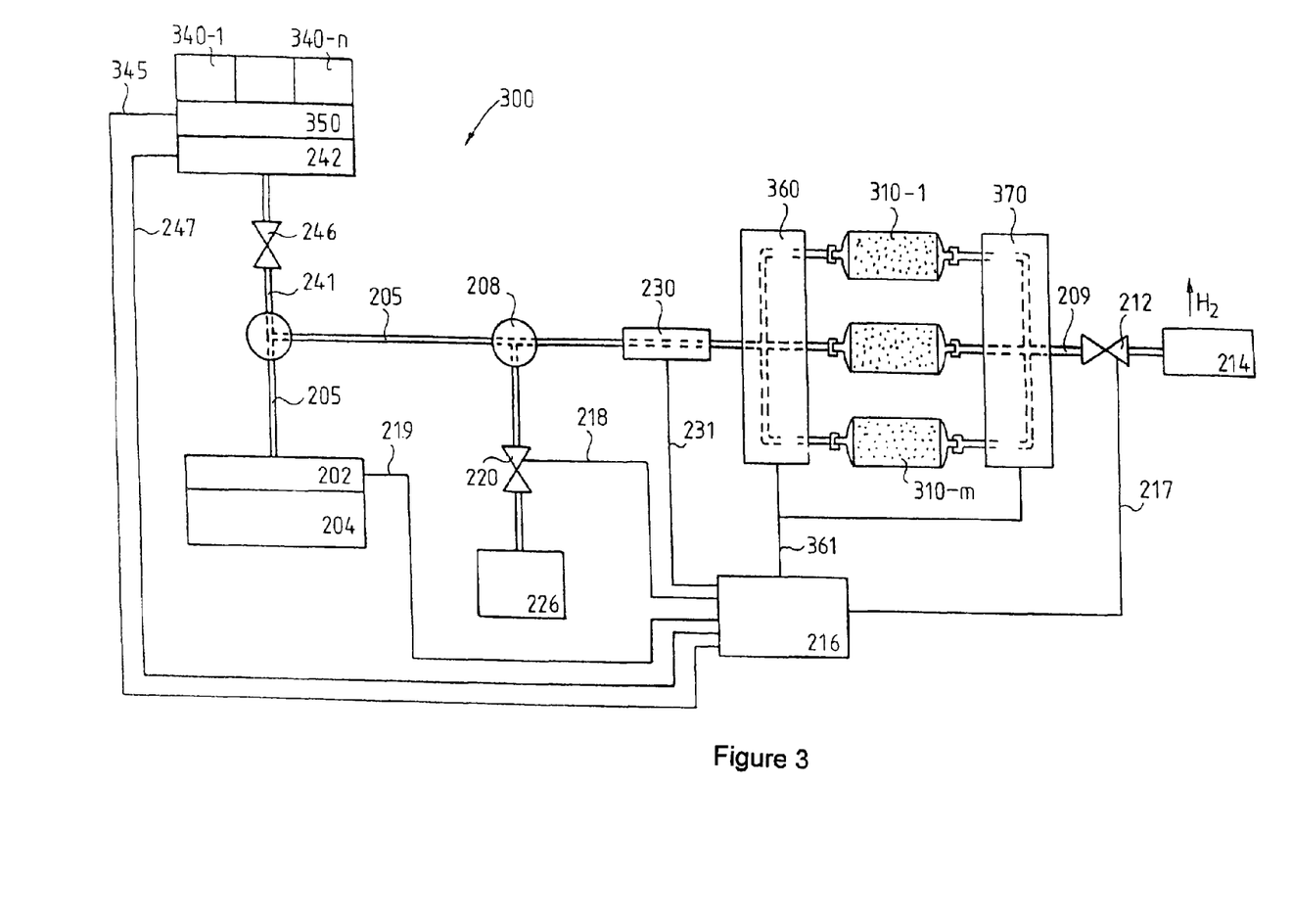
FIG. 3 is a schematic block diagram of a yet further laboratory scale hydrogenation apparatus to be used for performing the hydrogenation process according to the invention.

FIGS. 2 and 3 illustrate two further laboratory scale continuous flow hydrogenation apparatuses to be used when performing laboratory scale continuous flow hydrogenation processes. The hydrogenation apparatus 200 shown in FIG. 2 and the hydrogenation apparatus 300 shown in FIG. 3 are mainly appropriate for performing such reactions (characteristic especially to the derivatisation operations of combinatorial chemistry) in an automated manner, wherein there is a need to produce a plurality of qualitatively different substances in small amounts (i.e. various molecules constituting a whole library).

The hydrogenation apparatus 200 shown in FIG. 2 comprises a reservoir 204 equipped with a feed pump 202, a sample container 240 which provides the substance to be hydrogenated, an injector 242 connected to the sample container, a collecting element 208, a hydrogenation reactor 210, a pressure-adjusting unit 212, a product receptacle 214, a controlling electronics 216, a valve 220 and a hydrogen source 226. The inlet of the feed pump 202 is in fluid communication with the reservoir 204, while its outlet is connected through a pipe 205 to a first inlet of the collecting element 208. The inlet of the injector 242 is in fluid communication with the sample container 240, while its outlet is joined into the pipe 205 through a pipe 241 and a safety back-pressure valve 246 inserted into the pipe 241. Furthermore, the hydrogen source 226 is connected to a second inlet of the collecting element 208 through a pipe 221 and the valve 220 inserted into the pipe 221. The outlet of the collecting element 208 is connected through a pipe 207 to the inlet of the hydrogenation reactor 210. The outlet of the hydrogenation reactor 210 opens into the product receptacle 214 through a pipe 209 and the pressure-adjusting unit 212 inserted into the pipe 209. As a result of connecting the listed elements to each other, the hydrogenation apparatus 200 will be provided with a continuous flow path extending from the outlet of the feed pump 202 to the inlet of the product receptacle 214. The hydrogenation apparatus 200 is also provided with a heating/cooling means 230 which is arranged downstream directly before the hydrogenation reactor 210 and has a heat transferring or heat exchanging relation with the pipe 207.

The programmable controlling electronics 216 is electrically connected with the pressure-adjusting unit 212, the valve 220, the feed pump 202 and the injector 242 via electrical leads 217, 218, 219 and 247, respectively. The controlling electronics 216 is electrically connected also with the heating/cooling means 230 via an electrical lead 231.

The reservoir 204 contains a base solution; the sample, i.e. the substance to be hydrogenated is in the sample container 240. Here, the sample is in liquid phase and is preferably dissolved in the same base solution that can be found in the reservoir 204. The back-pressure valve 246 impedes the backflow of the base solution into the sample container 240. The injector 242 can be a pump of any kind being capable of providing a continuous and controlled feeding.

The construction and the function of the remaining parts of the hydrogenation apparatus 200 is identical to that of the corresponding parts (denoted by similar reference numbers) of the hydrogenation apparatus 100 shown in FIG. 1, and hence these parts are not discussed in more detail.

While the hydrogenation apparatus 200 is in operation, upon a first signal of the controlling electronics 216, the injector 242 feeds the sample through the pipe 205 and the back-pressure valve 246 into the flow path, wherein the sample dissolves in the base solution continuously fed by the feed pump 202 which results in the creation of the sample solution. The feeding of the sample into the flow path is ceased upon a second signal of the controlling electronics 216 arriving after the elapse of a predetermined period of time. As a result of the controlled feeding, "columns" of given lengths of the sample and the base solutions travel contiguously after each other towards the reactor 210 in the flow path. Mixing of the columns of the sample and the base solutions (which actually leads to a dilution of the sample solution) can be observed merely at the ends of the columns, since due to the flow conditions maintained within the hydrogenation apparatus 200 (a flow rate of 0.1 to 10 ml/s) and as a result of the inner diameters (preferably 0.5 mm), the columns of the sample and the base solutions flow in laminar manner.

It is clear that when the injector 242 is operated continuously the hydrogenation apparatus 200, similarly to the hydrogenation apparatus 100, is capable of producing the chosen hydrogenate in a large amount. When the feed pump 202 is operated continuously, by disrupting the operation of the injector 242 one has got the a possibility to wash over the flow path of the apparatus 200. Moreover, in case of heterogeneous hydrogenation, when a decrease in the chemical reactivity of the medium within the reactor 210 is observed (from eg. the fact that a steadily increasing amount of unreacted substance reaches the receptacle 214), by introducing a suitable solvent as the base solution one has got the possibility to improve/regenerate the chemical reactivity of the medium (i.e. the catalyst).

Furthermore, if the substance to be hydrogenated is changed when the base solution is continuously fed, eg. the sample container 240 is replaced manually, a sample solution column of a new substance can be produced and reacted in the flow path by the injector 242 brought into action again by the controlling electronics 216. Therefore, one has the possibility to collect the hydrogenate obtained in a first reaction in the receptacle 214, and then to reintroduce it into the hydrogenation apparatus 200 via the sample injector 242 at a continuous operation of the hydrogenation apparatus 200 after having replaced the sample container 240 or having recirculated the hydrogenate to the outlet of the container 240. This means that it will be possible to subject the obtained hydrogenate to a second hydrogenation reaction and thus to derive a new substance therefrom. As the reactor 210 is provided in the form of an easily replaceable cartridge, in case of heterogeneous hydrogenation it can be replaced with an other cartridge containing a catalyst selective to the second hydrogenation reaction.

The apparatus 300 shown in FIG. 3 is of particular applicability in performing the derivatisation operations of combinatorial chemistry quickly and in an automated manner. Considering its construction, it is very similar to the apparatus 200 illustrated in FIG. 2. Therefore, only those parts of the apparatus 300 are discussed in detail which differ from the elements of the hydrogenation apparatus 200. Furthermore, it is also noted here that, for the sake of clarity, those parts of the apparatus 300 which are identical with corresponding elements of the apparatus 200 are referred to by the same reference numbers used earlier in FIG. 2.

To perform an automatic change among the samples to be fed, the hydrogenation apparatus 300 comprises at least two sample containers 340-1, ..., 340-$n$ ($n \geq 2$). The sample containers 340-1, ..., 340-$n$ are not in fluid communication with each other, thus the samples stored therein cannot mix. The sample containers 340-1, ..., 340-$n$ are preferably arranged in a support rail (not shown in the figures) and can be replaced one by one. The sample containers 340-1, ..., 340-$n$ can also be formed as a single container with separate compartments being disconnected from each other.

The content of each sample container 340-1, ..., 340-$n$ is introduced into the flow path by the injector 242. The injector 242 is connected to the sample containers 340-1, ..., 340-$n$ through a switching valve 350. The switching valve 350 is an electronically controlled multiway selector valve which comprises a single outlet and as many inlets (here n) as the number of the sample containers 340-1, ..., 340-$n$. The outlet of the switching valve 350 opens into the injector 242, while each of its inlets is in a separate fluid communication with one of the sample containers 340-1, ..., 340-$n$. The switching valve 350 is electrically connected with the controlling electronics 216 via a lead 345. The task of the switching valve 350 is to open one of the sample containers 340-1, ..., 340-$n$ upon an adequate electric signal of the controlling electronics 216 and to introduce a sample into the injector 242 therefrom while keeping the remaining containers 340-1, ..., 340-$n$ closed.

To facilitate the (identical or different) hydrogenation reactions to be performed consecutively, the hydrogenation apparatus 300 comprises at least one hydrogenation reactor 310-1, ..., 310-$m$ ($m \geq 2$) provided also in the form of a replaceable cartridge. The internal structures/packings of the reactors 310-1, ..., 310-$m$ are identical or different; in case of eg. a heterogeneous hydrogenation the reactors 310-1, ..., 310-$m$ might contain identical or different catalysts, as it is required. The inlet of each reactor 310-1, ..., 310-$m$ is connected to a different outlet of an electronically controlled multiway switching valve 360. The switching valve 360 comprises a single inlet and as many outlets (here m) as the number of the applied reactors 310-1, ..., 310-$m$. The switching valve 360 is connected to the pipe 207 through its inlet. The outlet of each reactor 310-1, ..., 310-$m$ is connected to a different inlet of an electronically controlled multiway switching valve 370. The switching valve 370 comprises as many inlets (here m) as the number of the applied reactors 310-1, ..., 310-$m$ and a single outlet. The outlet of the switching valve 370 is connected to the pipe 209. The switching valves 360, 370 are both connected electrically with the controlling electronics 216 via a common lead 361.

After the sample containers 310-1, ..., 310-$n$ have been filled with the samples, the desired reactors 310-1, ..., 310-$m$ have been inserted and the hydrogenation apparatus 300 has been switched on, upon a signal of the controlling electronics 216 via the lead 345 the switching valve 350 chooses one of the sample containers 310-1, ..., 310-$n$ and forms within the valve body a free flow channel that extends from the inlet being in fluid communication with the sample container chosen to the injector 242. At the same time, the switching valve 350 closes all its inlets being in fluid communication with the remaining sample containers. Moreover, by properly governing the switching valves 360, 370 with the signal sent over the lead 361, the controlling electronics 216 chooses the desired reactor from the reactors 310-1, ..., 310-$m$ and connects it into the flow path. Then a flow of the base solution over the contiguous flow path, as well as the feeding of the hydrogen gas commence in a manner discussed earlier, and the pressure-adjusting unit 212 pressurizes the flow path. After filling up the flow path, upon a trigger signal of the controlling electronics 216 the injector 242 begins to feed the chosen sample into the flow path, as a result of which a column of the sample solution builds up within the flow path. Then the hydrogenation takes place in a manner discussed earlier.

To perform the hydrogenation of a different sample, after having disrupted the feeding carried out by the injector 242 the switching valve 350, upon a signal of the controlling electronics 216, establishes a flow channel with the sample container storing the desired sample. After having restarted the feeding carried out by the injector 242, the chosen second sample enters the flow path. If it is desired, the controlling electronics 216 can also effect a change among the reactors 310-1, ..., 310-$m$ simultaneously with the change of the sample. During that time the continuous flow of the base solution also performs a washover of the flow path.

The hydrogenation apparatuses 100, 200, 300 to be used when performing laboratory scale hydrogenation processes are also equipped with a display unit and a keyboard for data inputting (not shown in the figures) besides the structural elements effecting the continuous flow hydrogenation.

The total volume of the contiguous flow path of the laboratory scale continuous flow hydrogenation apparatuses 100, 200, 300 is at most 10 cm$^3$, preferably at most 5 cm$^3$.

In a process according to the present invention, a hydrogenation reaction is performed under very precisely controllable reaction conditions, and in particular by the laboratory scale hydrogenation apparatuses 100, 200, 300 discussed previously in detail. The course of the process has already been discussed in relation to the operation of the apparatuses 100, 200, 300, and therefore it is not treated here.

The laboratory scale continuous flow hydrogenation process according to the invention and its completion by means of the laboratory scale hydrogenation apparatuses 100, 200, 300 will be illustrated by a few simple examples below.

Example 1

To reduce a given model compound (5-nitroindol) in accordance with the above reaction scheme (to 5-aminoindol), the reservoir 104 of the hydrogenation apparatus 100 was filled with, as a sample solution, a stock solution of a 1:1 mixture of EtOAc:EtOH containing 5-nitroindol in a concentration of 0.05 mol/dm$^3$. At the same time, a catalyst of 10% by weight bone black palladium (Pd) or Raney nickel was arranged within the reactor 110 as the catalyst packing. After this, a flow rate of 0.1 ml/s was set within the apparatus by means of the feed pump 102, while a pressure of 30 bar was generated in the flow path by means of the pressure-adjusting unit 112. During the operation of the apparatus these values were continuously maintained. The produced hydrogenate, i.e. the 5-aminoindol was collected in the product receptacle 114, and then was subjected to an analytical assay (HPLC UV, λ=254 nm). As a result of the analysis, we concluded that the collected hydrogenate was of the purity of 99.9%, and the yield of the reaction was about 96%.

According to the literature (see *Bioorg. Med. Chem.* 8, 2000, 1415-1422), if the same reaction is performed by means of a traditional hydrogenation apparatus under atmospherical pressure and ambient temperature in absolute ethanol, with using a catalyst of 5% by weight Pd/C, the reaction takes place in 3 to 6 hours, and a yield of about 98% can be achieved.

Example 2

To debenzylate a given model compound (cBz-tryptamine) in accordance with the above reaction scheme (to 3-ethyl-aminoindol), the reservoir 104 of the hydrogenation apparatus 100 was filled with, as a sample solution, a stock solution of a 1:1 mixture of EtOAc:EtOH containing cBz-tryptamine in a concentration of 0.05 mol/dm$^3$. At the same time, a catalyst of 10% by weight bone black palladium was arranged within the reactor 110 as the catalyst packing. After this, a flow rate of 0.1 ml/s was set within the apparatus by means of the feed pump 102, while a pressure of 30 bar was generated in the flow path by means of the pressure-adjusting unit 112. During the operation of the apparatus these values were continuously maintained. The produced hydrogenate, i.e. the 3-ethyl-aminoindol was collected in the product receptacle 114, and then was subjected to an analytical assay (HPLC UV, λ=254 nm; mass spectroscopy). As a result of the analysis, we concluded that the collected hydrogenate was of the purity of 97%, and the yield of the reaction was about 94%.

According to the literature (see *Helv. Chim. Acta.* 2, 1946, 1128), if the same debenzylation reaction is performed by means of a traditional hydrogenation apparatus under atmospherical pressure and ambient temperature in muriatic ethanol, the yield of the reaction will be about 95%.

Example 3

To debenzylate a given model compound (N-benzyl-phenethylamine) in accordance with the above reaction scheme (into phenethylamine), the reservoir 104 of the hydrogenation apparatus 100 was filled with, as a sample solution, a stock solution of a 1:1 mixture of EtOAc:EtOH containing N-benzyl-phenethylamine in a concentration of 0.05 mol/dm$^3$. At the same time, a catalyst of 10% by weight bone black palladium was arranged within the reactor 110 as the catalyst packing. After this, a flow rate of 0.1 ml/s was set within the apparatus by means of the feed pump 102, while a pressure of 50 bar was generated in the flow path by means of the pressure-adjusting unit 112. The temperature of the sample solution was set to 60° C. by means of the heating/cooling means 130, and during the operation of the apparatus these values were continuously maintained. The produced hydrogenate, i.e. the phenethylamine was collected in the product receptacle 114, and then was subjected to an analytical assay (HPLC UV, λ=254 nm; mass spectroscopy). As a result of the analysis, we concluded that the collected hydrogenate was of the purity of 98%, and the yield of the reaction was about 99.9%.

According to the literature (see *J. Org. Chem.* 49, 1984, 4076), the present debenzylation reaction takes place in a traditional hydrogenation apparatus under a pressure of 3.1 bar and ambient temperature in a 95% by weight ethanol, and the yield of the reaction is 100%.

From the above examples it is absolutely clear that the hydrogenation processes performed e.g. by the hydrogenation apparatuses 100, 200, 300 discussed above—besides the advantages outlined earlier—provide approximately the same reaction yields that can be achieved by the traditional reactions.

Furthermore, the hydrogenation reactions discussed in the above examples can also be performed by the hydrogenation apparatuses 100, 200, 300 in a fully automated manner. For this, the above three model compounds are arranged in separate sample containers 340-1, 340-2, 340-3 and are supplied in given amounts successively into the pipe 205 by the sample injector 242, wherein the solvent of the 1:1 mixture of EtOAc:EtOH stored in the reservoir 204 is continuously fed into the pipe 205 by the feed pump 202. The hydrogenation reaction of a certain model compound takes place within that hydrogenation reactor 310-1, 310-2, 310-3 which is filled with a catalyst matching with the model compound concerned (the switching valve 360 provides for the entering of the model compound into the appropriate reactor), and each of the produced hydrogenates is collected in a product receptacle 214 separately. If in the present case the same catalyst (10% by weight bone black palladium) is applied, the usage of a single hydrogenation reactor is also adequate. In such a case, the solvent supplied continuously provides for the washover of the hydrogenation reactor between the successive hydrogenation reactions.

What is claimed is:

1. A laboratory scale continuous flow hydrogenation process for hydrogenating a sample in a pressure range below supercritical pressure values, comprising the steps of:
  (i) supplying at least a solvent of the sample to be hydrogenated by means of a feed pump (102; 202) into a flow path;
  (ii) feeding hydrogen into said flow path through a valve (120; 220) on a section located after the sample supplying position of said flow path;
  (iii) leading dissolved sample in the presence of a catalyst through a hydrogenation reactor (110; 210, 310-1, ..., 310-$m$), wherein said reactor being inserted into a section of the flow path located after the hydrogen feeding position;
  (iv) maintaining the pressure of the reaction in a given pressure range by means of a pressure-adjusting unit (112; 212) inserted into the flow path after the hydrogenation reactor (110; 210, 310-1, ..., 310-$m$), said pressure adjusting unit being capable of tuning said pressure in a quasi-continuous manner;
  (v) collecting a hydrogenate formed within the hydrogenation reactor (110; 210, 310-1, ..., 310-$m$) in a product receptacle (114; 214) connected to the end of the flow path, wherein
during said step (i) creating a base solution from said solvent and providing a flow of said base solution with said pump (102; 202) having a substantially constant volume rate, and adding said sample into said flow path; and
in said step (iv) setting the upper value of the pressure range by the pressure-adjusting unit (112; 212) simultaneously with the base solution of step (i) flowing through the reactor (110; 210, 310-1, ..., 310-$m$) to a value that falls below supercritical pressure values of the base solution.

2. The laboratory scale hydrogenation process according to claim 1, wherein the sample to be hydrogenated is supplied into the flow path in given periods.

3. The laboratory scale hydrogenation process according to claim 2, wherein within successive periods different samples are supplied and the hydrogenates generated in periods are separately collected.

4. The laboratory scale hydrogenation process according to claim 2, wherein each sample period is hydrogenated in different hydrogenation reactors (310-1, ..., 310-$m$).

5. The laboratory scale hydrogenation process according to claim 1, wherein the sample to be hydrogenated is supplied together with the solvent.

6. The laboratory scale hydrogenation process according to claim 1, wherein in a section of the flow path preceding the hydrogenation reactor (110; 210, 310-1, ..., 310-$m$) the temperature of the dissolved sample is changed to the prescribed temperature of the reaction that falls below supercritical temperature values of the base solution.

7. The laboratory scale hydrogenation process according to claim 1, wherein the total inner volume of the flow path together with the volume of the hydrogenation reactor (110; 210) is at most 10 cm$^3$.

8. The laboratory scale hydrogenation process according to claim 1, wherein gaseous hydrogen is generated by in-situ electrolysis.

9. The laboratory scale hydrogenation process according to claim 8, wherein an asymetric pressure electrolytic cell is used to generate hydrogen with a pressure being higher than the pressure maintained in the flow path.

10. The laboratory scale hydrogenation process according to claim 9, wherein gaseous hydrogen is generated with a pressure ranging from 1 to 500 bar.

11. A laboratory scale continuous flow hydrogenation process for hydrogenating a sample in a pressure range below supercritical pressure values, comprising the steps of:
  (i) supplying at least a solvent of the sample to be hydrogenated by means of a feed pump (102; 202) with a substantially constant volume rate into a flow path thereby creating a base solution;
  (ii) adding said sample being dissolved into said flow path;
  (iii) feeding hydrogen into said flow path through a valve (120; 220) configured to transmit hydrogen only into a single direction, said feeding taking place on a section located after the sample supplying position of said flow path;
  (iv) leading the dissolved sample in the presence of a catalyst through a hydrogenation reactor (110; 210, 310-1, ..., 310-$m$), wherein said reactor being inserted into a section of the flow path located after the hydrogen feeding position;
  (v) maintaining the pressure of the reaction in a given pressure range by means of a pressure-adjusting unit (112; 212), the pressure-adjusting unit (112; 212) being inserted into the flow path after the hydrogenation reactor (110; 210, 310-1, ..., 310-$m$) and capable of tuning said pressure quasi-continuously, and setting the upper value of the pressure range by the pressure-adjusting unit (112; 212) simultaneously with the base solution flowing through the reactor (110; 210, 310-1, ..., 310-$m$) to a value that falls below supercritical pressure values of the base solution;
  (vi) collecting a hydrogenate formed within the hydrogenation reactor (110; 210, 310-1, ..., 310-$m$) in a product receptacle (114; 214) connected to the end of the flow path.

* * * * *